3,848,064
PRODUCTION OF SULFUR TETRAFLUORIDE
FROM SULFUR CHLORIDES AND FLUORINE
Wilfried Becher, Ilten, and Joachim Massonne and Wilhelm Pohlmeyer, Hannover, Germany, assignors to Kali-Chemie Aktiengesellschaft, Hannover, Germany
No Drawing. Filed Apr. 12, 1973, Ser. No. 350,416
Claims priority, application Germany, Apr. 14, 1972,
P 22 17 971.1
Int. Cl. C01b 17/45
U.S. Cl. 423—469                                18 Claims

ABSTRACT OF THE DISCLOSURE

Sulfur tetrafluoride is continuously produced at 50 to 130° C. by reacting, optionally in the presence of Group V compounds, gaseous fluorine with sulfur chlorides having the formula $S_xCl_2$, wherein $x$ ranges from 1.1 to 6, preferably from 1.8 to 2.2. Sulfur chlorides are reformed from intermediate sulfur dichloride.

FIELD OF THE INVENTION

Sulfur tetrafluoride has proved itself to be a valuable fluorinating agent since in many organic compounds it makes possible the selective substitution of oxygen or sulfur by fluorine. The resulting fluorine compounds could be obtained in different processes only in a very complicated manner or at very low yields. Also, many inorganic fluorine compounds can be obtained with the help of sulfur tetrafluoride easily and in high purity.

BACKGROUND OF THE INVENTION

For the manufacture of sulfur tetrafluoride there are many processes already known, such as for example, U.S. Pat. No. 2,992,073 proposes the making of sulfur tetrafluoride by reacting an alkalifluoride with sulfur dichloride in an inert solvent. However, the yields of such a process do not exceed 70%; and as a by-product, an alkalichloride is obtained which is contaminated with sulfur chloride.

According to U.S. Pat. No. 2,972,518 an alkalifluoride is reacted with carbondisulfide and chlorine at temperatures in the range from 125 to 700° C. and at pressures from 5 to 50 ata. In addition to the sulfur tetrafluoride one will obtain fluorochlorohydrocarbons as a by-product as well as an unusable residue which consists of contaminated alkali salts. The above discussed manufacturing methods of sulfur tetrafluoride hardly can be considered as having any value for a large scale production of sulfur tetrafluoride since the raw materials are costly, the efficiency of the process is unsatisfactory or, there are by-products formed which are undesirable and the disposition of which requires additional expenditures.

Furthermore, from the teachings of U.S. Pat. No. 3,373,000 and British Pat. No. 951,569 there is taught a manufacturing process by which sulfur and sulfur chloride can be brought to reaction with the chlorine monofluoride or chlorine trifluoride. As a result, one obtains substantially sulfur tetrafluoride and chlorine, however, there is a disadvantage accompanying such processes in that the separation of the reaction products is complicated and costly. For example, in order to separate chlorine, one has to transform the sulfur tetrafluoride by means of boron trifluoride into an adduct $SF_4 \cdot BF_3$ and regain same from such adduct in a process in which the adduct is brought to reaction with sodium fluoride under heating. During this process the chlorine will be obtained in a contaminated form.

It has been already attempted to prevent the formation of by-products during the manufacturing of sulfur tetrafluoride by starting out directly with the elements. For example, German OLS (Laid Open Application) No. 1,667,371 proposes that gaseous fluorine be brought in contact with molten sulfur at temperatures of 300 through 450° C., thereafter obtaining sulfur tetrafluoride from volatile reaction products. The disadvantages associated with the last mentioned process is that a high reaction temperature is required and, in addition to sulfur tetrafluoride, there will be obtained a large quantity of low sulfur fluorides. A large portion of the fluorine which has been introduced will also be lost to undesirable by-products.

SUMMARY OF THE INVENTION

It is, therefore, an object of the present invention to provide an improved continuous process for the manufacture of sulfur tetrafluoride which substantially eliminates the above discussed disadvantages of known processes.

According to the present invention a process is provided for the continuous manufacture of sulfur tetrafluoride wherein sulfur chloride having the general formula $S_xCl_2$, in which $x$ has a value between 1.1 and 6, especially between 1.8 and 2.2 is reacted with gaseous fluorine at a temperature of between 50 and 130° C. to yield sulfur tetrafluoride and sulfur dichloride and wherein the sulfur dichloride is brought into reaction with sulfur after which the resulting $S_xCl_2$ is returned into the first mentioned reaction and the sulfur tetrafluoride is collected in a storage container.

The process according to the present invention can be summed up by the following reaction equations:

$$S_xCl_2 + 2(x-1)F_2 \rightarrow (x-1)SF_4 + SCl_2 \qquad (1)$$

$$SCl_2 + (x-1)S \rightarrow S_xCl_2 \qquad (2)$$

$$S + 2F_2 \rightarrow SF_4 \qquad (3)$$

As can be seen from equation (3) only sulfur and fluorine are consumed as raw materials for the production of sulfur tetrafluoride; the sulfur chloride has a function only as a reaction intermediate and will not enter into the final mass balance.

In performing the process according to the present invention, any suitable arrangement can be used in which the sulfur dichloride obtained in a reaction vessel can be brought into contact with sulfur and transformed into sulfur chloride having a higher sulfur content.

One may, for example, introduce the gaseous fluorine into sulfur chloride $S_xCl_2$ contained in a reactor, allow the forming gas mixture containing sulfur dichloride and sulfur tetrafluoride to enter an absorber which is charged with sulfur and then return the $S_xCl_2$ formed from the sulfur dichloride in the absorber into the reactor and collect the sulfur tetrafluoride leaving the absorber in a storage container.

As sulfur chloride one may use a commercially available product, however, it is also possible that the sulfur chloride produced in the reactor from sulfur and chlorine.

At the beginning of the reaction substantially any type of sulfur chloride can be introduced. If, for example, sulfur dichloride is used as the starting material, sulfur chloride will form in the absorber from chlorine and sulfur after a short time and which after having been returned into the reactor, will undergo the reaction according to the formula (1) into $SCl_2$ and $SF_4$.

The reaction between the sulfur chloride $S_xCl_2$ and fluorine can be conducted in the temperature range between 50 and 130° C., however, the temperature range between 100 and 120° C. is preferred since in this temperature range undesirable by-products like sulfur hexafluoride and disulfur difluoride are formed only in minor quantities. The presence of humidity should be avoided in order to prevent the formation of thionylfluoride as an additional by-product.

In order to remove the chlorine containing sulfur compounds from the gaseous reaction products formed in the reactor, the gas mixture leaving the reactor is passed through an absorber which is filled with sulfur lumps or sulfur pellets. In the absorber, sulfur dichloride reacts with the sulfur and is converted to a sulfur rich compound $S_xCl_2$, with $x$, varying between 1.1 and 6. During this process attention should be given to sufficient removal of heat generated in the above reaction. It is advantageous to keep the absorber at a temperature between 0° and 30° C.

With a properly designed absorber substantially the entire sulfur dichloride content is removed from the gaseous product and retained. Sulfur chloride $S_xCl_2$ may be formed in which $x$ may have values between 1.8 and 2.2. The liquid sulfur chloride which has been formed and which runs down to the bottom of the absorber will be returned into the reactor and will be reacted again with the fluorine. The gas leaving the reactor consists substantially of sulfur tetrafluoride and can be collected in a cooling trap and fed into a storage container.

The sulfur tetrafluoride can also be produced in a device consisting of a reactor which is connected by a circulation loop to a cooled dissolving vessel containing sulfur. According to a preferred embodiment, the sulfur chloride $S_xCl_2$ is introduced at the head of the reactor, while the fluorine is introduced countercurrently at the bottom of the reactor. The flow rate of the fluorine is adjusted in such a manner that only a part of the sulfur chloride $S_xCl_2$ will become sulfur dichloride. The temperature in the reactor is kept preferably within the range of 100 and 120° C. The sulfur chloride which is removed at the bottom of the reactor will subsequently be fed into the dissolving vessel where sulfur is being dissolved in the sulfur chloride, thus regenerating the initial sulfur rich form $S_xCl_2$, which is fed back into the reactor. The sulfur tetrafluoride formed during the reaction is removed at the head of the reactor. For further purification one may pass the sulfur tetrafluoride through an absorber charged with sulfur.

By observing optimum reaction conditions, such as, the reaction temperature and the composition of the sulfur chlorine, one may obtain in both of the above-described processes according to the present invention sulfur tetrafluoride with a purity of up to 98 vol. percent. Sulfur hexafluoride and disulfur difluoride will form only in negligible quantities.

It has been found in practicing the process according to the present invention that one may introduce further improvements when it is performed in the presence of compounds containing the elements of the fifth main group of the periodical table of elements. The compounds can be introduced in tri- or pentavalent form. Preferably, the chlorides and fluorides of such elements are used. The most obvious catalytic effect is observed with the antimony compounds. A molar ratio $SbCl_3:S_xCl_2$ of 1:1000 is sufficient to obtain a good catalytic effect. Phosphorus and arsenic compounds have also proved themselves to be good catalysts, however, due to the formation of the volatile phosphorus and arsenic pentafluoride which leaves the reaction zone together with the formed sulfur tetrafluoride, they are less suitable for the synthesis. On the other hand, by using antimony halides, the catalytic activity will not substantially be affected or reduced even after a long operating time.

By adding such catalysts into the sulfur chloride components, a considerable improvement is attained. For example, in order to attain optimum yields, it will not be necessary that the reaction temperature and the composition of the sulfur chloride be kept within a narrow range, which otherwise would be a requirement if the process is performed in a reaction without catalysts. The conditions for obtaining practically pure sulfur tetrafluoride can thus be varied over a wider range. For example, even at a temperature below 100° C. one may obtain optimum efficiency. In addition, the reaction rate can be considerably increased. The process according to the present invention is further illustrated by the following examples:

EXAMPLE 1

A small reactor made of stainless steel having a gas inlet tube and a thermowell and which is connected by means of a conduit with a vertically installed double wall absorber is charged with 240 g. pure dry sulfur in granular form. For producing sulfur chloride one will introduce 270 g. chlorine under cooling of the reactor and the absorber which was similarly charged with sulfur of the above described quality; the temperature of the reactor is kept at about 90° C. The temperature of the absorber was set at about 20° C. In order to prevent humidity from entering the system, the outlet of the absorber was coupled with a soda-lime tower.

After complete introduction of the chlorine, a test sample is taken out of the reactor for analyzing the formed sulfur chloride. It corresponded in composition to the formula $S_{1.93}Cl_2$.

For producing sulfur tetrafluoride, a steel flask filled with fluorine was coupled to the reactor inlet. A cooling trap for receiving the evolving sulfur tetrafluoride was installed between the absorber and the soda-lime tower. Fluorine was passed from the flask in small quantities into the reactor and after displacing the inert gases by the gaseous products, the cooling trap has been cooled with a cooling mixture of $CO_2$. The flow rate of fluorine was then adjusted to 10 l./hr. and the temperature of the reactor was set to 115° C. The gas mixture leaving the reactor entered the absorber where the sulfur dichloride reacted with the sulfur to form sulfur chloride $S_xCl_2$. The liquid sulfur chloride was returned into the reactor and went again into a reaction with the fluorine. After 19 hours of reaction time the cooling trap contained 456 g. of product, the hydrolyzable components (99.5 vol. percent) of which consisted of 69.2 weight percent of fluorine and of 30.8 weight percent of sulfur. Total analysis showed the following composition:

|  | Vol. percent |
|---|---|
| $SF_4$ | 96.4 |
| $S_2F_2$ | 2.9 |
| $SF_6$ | 0.35 |
| Cl | 0.03 |
| $N_2, O_2$ | 0.1 |

A further analysis of the contents of the reactor shows the presence of a sulfur chloride compound having the composition of $S_{2.08}Cl_2$.

EXAMPLE 2

To the sulfur chloride from the run of Example 1, 13.7 g. (0.1 mole) of $PCl_3$ have been added. The synthesis of $SF_4$ was carried out in a similar manner as described in Example 1. The reaction temperature was, however, raised to 120° C. The fluorine flow rate could be increased to 25 l./h. The gaseous product contained 0.6 vol. percent inert gases ($SF_6$, air) and up to 95.8 vol. percent $SF_4$. As a hydrolyzable component one obtained in addition, a small amount of $PF_5$ (0.9% $PO_4''$).

EXAMPLE 3

As a variation of Example 1, in the reactor 2.3 g. $SbCl_3$ (0.01 mole) has been added to 250 g. $S_2Cl_2$ and the reactor temperature has been set to 80° C. One was able to feed 40 l./hr. fluorine into the reactor. The gas samples repeatedly taken show a $SF_4$ content of 98 to 99%.

EXAMPLE 4

Into a stainless steel reactor which by means of a circulation loop has been coupled with a pump and with a dissolving vessel filled with sulfur and at the lower end thereof a conduit for feeding the fluorine as well as at the head of which there was provided an outlet for removing the sulfur tetrafluoride, 20 kg. of $S_2Cl_2$ have been charged to which previously 20 g. $SbCl_3$ have been added. This mixture has been pumped at a temperature of 100° C. through the loop described above over a layer of corundum chips. The sulfur chloride has been fed in a counterflow into a stream of 100 l./hr. of $F_2$. The sulfur chloride which contained the $SCl_2$ formed during the reaction and which has been removed at the bottom of the reactor has been fed into the dissolving vessel which has been equipped with a cooling system. After the reaction with the sulfur, the sulfur chloride has been returned back through the head of the reactor.

The gas which left at the head of the apparatus has been passed into an absorber charged with granular sulfur in order to remove the sulfur chloride components, which were returned in the form of $S_xCl_2$ ($x \approx 2$) into the reactor.

The gaseous product which has been produced in the just described apparatus contained about 98% sulfur tetrafluoride.

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. A process for the continuous manufacture of sulfur tetrafluoride comprising:
   (1) reacting in a reaction zone, sulfur chloride of the formula $S_xCl_2$ with gaseous fluorine at a temperature of about 50 to about 130° C. to form sulfur tetrafluoride and sulfur dichloride, (2) reacting said sulfur dichloride with sulfur to form $S_xCl_2$, returning to said reaction zone said sulfur dichloride of the formula $S_xCl_2$ formed in step (2) and (3) collecting said sulfur tetrachloride, said $x$ having a value of about 1.1 to about 6.0.

2. A process as defined in claim 1 wherein $x$ has a value of about 1.8 to about 2.2.

3. A process as defined in claim 1 wherein said reaction is carried out at a temperature of about 100 to about 120° C.

4. A process as defined in claim 1 further comprising introducing the products of step (1) into an absorber containing sulfur to form $S_xCl_2$, said $S_xCl_2$ is then returned to said reaction zone and said sulfur tetrafluoride is collected.

5. A process as defined in claim 4 wherein said absorber is maintained at a temperature of about 0 to about 30° C.

6. A process as defined in claim 4 wherein said sulfur is in the form of lumps or pellets.

7. A process as defined in claim 11 wherein any sulfur chloride which collects at the base of said absorber is returned to said reaction zone.

8. A process as defined in claim 1 carried out in the substantial absence of any humidity.

9. A process as defined in claim 1 wherein said reaction is carried out in the presence of a compound containing an element selected from the fifth main group of the periodic table.

10. A process as defined in claim 9 wherein said compounds are in tri- or pentavalent form.

11. A process as defined in claim 9 wherein said compounds are chlorides or fluorides.

12. A process as defined in claim 9 wherein said element is selected from the group consisting of antimony, phosporous and arsenic.

13. A process as defined in claim 12 wherein said element is antimony.

14. A process as defined in claim 13 wherein said compound is an antimony chloride and is employed in a ratio of about $SbCl_2$: $SbCl_3$ and 1:1000.

15. A process as defined in claim 9 carried out at a temperature below about 100° C.

16. A process as defined in claim 8 wherein said reaction zone communicates with a cooled dissolving vessel containing sulfur.

17. A process as defined in claim 16 wherein said sulfur chloride ($S_xCl_2$) is recirculated in succession through said reaction zone and a cooled dissolving vessel charged with sulfur in which vessel said sulfur dichloride formed in the reactor is reconverted to $S_xCl_2$, and wherein said fluorine is introduced into the bottom of the reactor in countercurrent to the sulfur chloride at a rate such that there is present continually an excess of $S_xCl_2$, said sulfur tetrafluoride being withdrawn from the reactor overhead.

18. A process as defined in claim 16 wherein a portion of said $S_xCl_2$ is withheld.

References Cited

UNITED STATES PATENTS

| | | | |
|---|---|---|---|
| 1,341,423 | 5/1920 | Gegenheimer et al. | 423—469 |
| 2,992,073 | 7/1961 | Tullock | 423—469 |
| 3,185,543 | 5/1965 | Trout | 423—489 |
| 3,054,661 | 9/1962 | Mutterties | 423—469 |
| 3,399,036 | 8/1968 | Kleinberg et al. | 423—469 |

FOREIGN PATENTS

| | | | |
|---|---|---|---|
| 951,569 | 3/1964 | Great Britain | 423—469 |
| 877,458 | 9/1961 | Great Britain | 423—469 |
| 248,071 | 2/1961 | Australia | 423—469 |
| 875,209 | 8/1961 | Great Britain | 423—469 |

EARL C. THOMAS, Primary Examiner

B. E. HEARN, Assistant Examiner

U.S. Cl. X.R.

423—489, 561

UNITED STATES PATENT OFFICE
CERTIFICATE OF CORRECTION

Patent No. 3,848,064          Dated November 12, 1974

Inventor(s) Wilfried Becher, Joachim Massonne, Wilhelm Pohlmeyer

It is certified that error appears in the above-identified patent and that said Letters Patent are hereby corrected as shown below:

Column 4, line 60, change " $PO_4$ " " to -- $PO_4^{---}$ --.
Claim 1, line 10, change "tetrachloride" to --tetrafluoride--.

Claim 14, lines 2-3, change "a ratio of about $SbCl_2:SbCl_3$ and 1:1000" to --a molar ratio $SbCl_3:S_xCl_2$ of about 1:1000--.

Signed and Sealed this

*thirtieth* Day of *September 1975*

[SEAL]

*Attest:*

RUTH C. MASON          C. MARSHALL DANN
*Attesting Officer*          *Commissioner of Patents and Trademarks*